Sept. 30, 1969     F. CALEMARD     3,469,479
METHODS AND APPARATUS FOR DIVIDING
THERMO-FUSIBLE SYNTHETIC
PLASTIC MATERIALS
Filed March 31, 1967     2 Sheets-Sheet 1

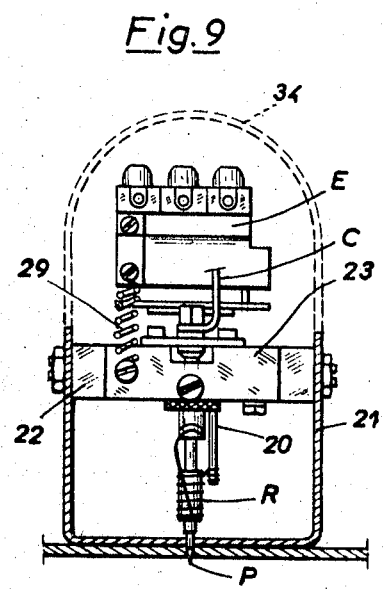
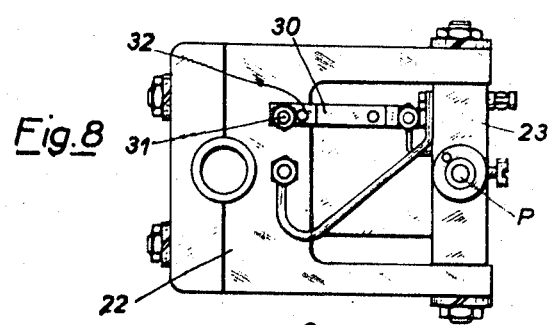
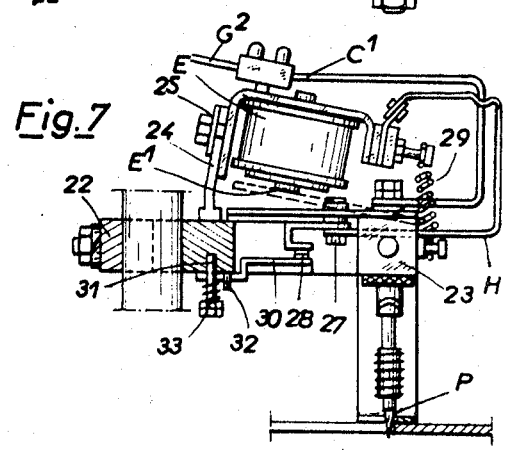
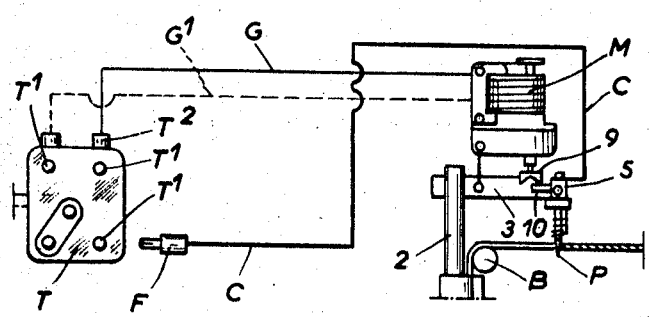
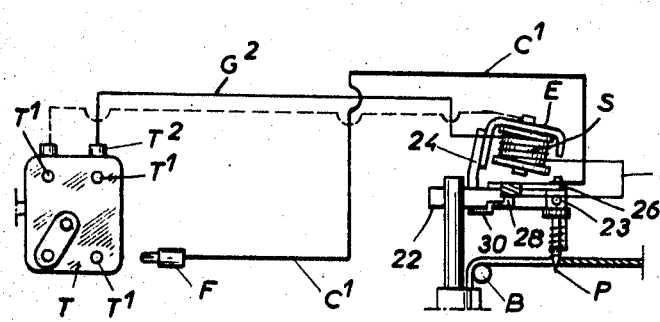

United States Patent Office 3,469,479
Patented Sept. 30, 1969

3,469,479
METHODS AND APPARATUS FOR DIVIDING THERMO - FUSIBLE SYNTHETIC PLASTIC MATERIALS
François Calemard, 15 Rue Buffon, Saint-Etienne, Loire, France
Filed Mar. 31, 1967, Ser. No. 627,368
Claims priority, application France, Apr. 29, 1966, 9,452
Int. Cl. B26d 7/10
U.S. Cl. 83—16       10 Claims

ABSTRACT OF THE DISCLOSURE

Method and apparatus for dividing thermo-fusible synthetic plastic material by a heated pin which is pivotally reciprocated in the direction of the line of cut during passage of the material past the pin.

---

The present invention relates to methods and apparatus for dividing thermo-fusible synthetic plastic material, and is more particularly, although not exclusively, concerned with fabrics made from said material on weaving looms.

It is well known to divide fabrics by the hot cutting of fabrics having a base of thermo-fusible fibres by means of heating blades or points. Chiefly in the case of fabrics which have a light texture, such as a voile, this cutting should permit the formation of clean neat selvedges without any charring, and satisfactorily welded.

It is the general object of the present invention to fulfil these desired ends.

According to one aspect of the present invention there is provided a method of dividing thermo-fusible synthetic plastics material by means of a heated dividing element, the method comprising the steps of effecting relative displacement between the material and the heated element in such a manner that the heated element divides the material along a predetermined line, and simultaneously imparting to the heated element a pivotal, reciprocatory movement so that that portion of the element which is in contact with the material reciprocates in a plane which includes the line of division.

According to another aspect of the present invention, there is provided apparatus for dividing thermo-fusible synthetic plastic material, the apparatus comprising a dividing element which is arranged to be heated, means for mounting said element so that relative displacement between a piece of thermo-fusible synthetic plastic material and said element may be effected for dividing the material along a predetermined line, and means for simultaneously imparting to said element a pivotal, reciprocating movement so that that portion of the element which, in operation, contacts the material will reciprocate in a plane which includes the line of division.

For a better understanding of the invention, and to show how the same may be carried into effect, reference will now be made, by way of example, to the accompanying drawings, in which:

FIG. 7 is a side elevation, in longitudinal section, of a further embodiment of the invention;

FIG. 8 is a view from below corresponding to FIG. 7;

FIG. 9 is a front elevation corresponding to FIG. 7;

FIG. 10 is a diagrammatic view showing a circuit diagram for use in connection with the embodiment of FIG. 1; and FIG. 11 is a view similar to FIG. 10 showing a circuit diagram for use in connection with the embodiment of FIG. 7.

Figure 1:
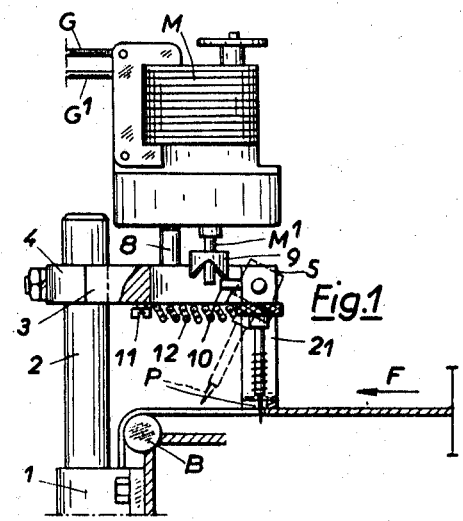
FIG. 1 is a diagrammatic side elevation, partly in section, of one embodiment of the invention.
Figure 2:
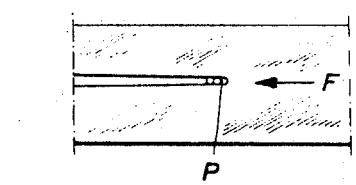
FIG. 2 is a diagrammatic plan view corresponding to FIG. 1.
Figure 4:
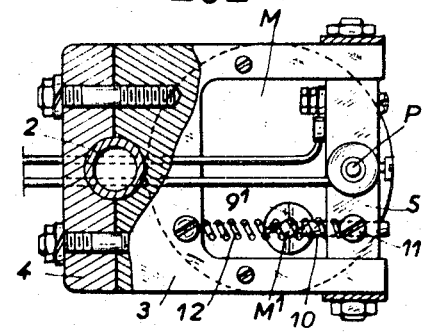
FIG. 4 is a view from below, partly in section, corresponding to FIG. 3.
Figures 3, 5:
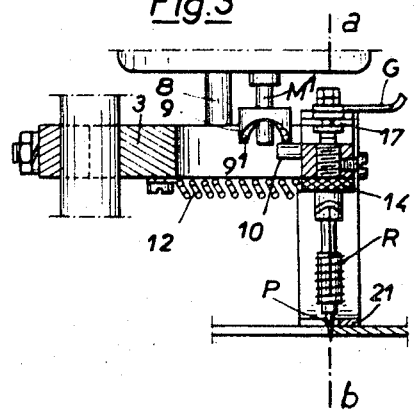
FIG. 3 is a longitudinal sectional view, drawn to a larger scale, of a detail of FIG. 1.
FIG. 5 is a front elevation, partly in section, corresponding to FIG. 3.
Figure 6:
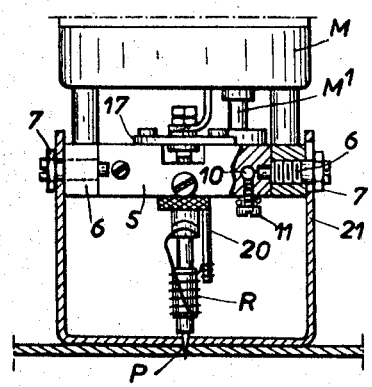
FIG. 6 is a vertical section taken on the line a–b of FIG. 3 and drawn to a larger scale.

In the drawings, there are shown two embodiments of apparatus for dividing thermo-fusible fabrics, each having one or more heated pins P which are arranged to pass through the thickness of a fabric along a cutting line or lines and to be given a to and fro movement so that as the fabric passes beneath the pins (in the direction indicated by the arrom F in FIGS. 1 and 2), the fabric fibres may be cut by fusion through the heat of the pins, while causing the newly formed selvedges to be welded without any irregularities. The apparatus shown in FIGS. 1 to 6 also includes supports 1 which are fixed adjustably in transverse manner on the cloth beam or breast beam B of the loom, depending on the number of cuts to be effected on the fabric. These supports 1, by means of their guide columns 2, permit the engagement and the locking in the vertical sense of supporting shoes 3 which are held in position by means of straps or clamps 4 which are secured to the respective shoes 3 by bolts so as to embrace their associated guide columns 2.

Each supporting shoe 3 is formed with two arms at the end of which is mounted a block 5 for pivotal movement about an axis defined by two screws 6 which form a pivotal mounting for the block 5. The screws 6 are held in position by lock-nuts 7.

At its upper portion, each supporting shoe 3, by means of spacer rings 8 and locking screws, determines the position in the vertical sense of an electrical geared motor M constructed in known manner, whose output shaft $M^1$ is provided with a generally cylindrical cam member 9 which is formed with downward projections $9^1$. This cam 9, which has four downward projections in the embodiment shown in FIGS. 1 to 6, is in permanent contact with a peg 10 which extends substantially horizontally, i.e. perpendicularly with respect to the shaft $M^1$. The peg 10 is fixed transversely in the pivoting block 5 by means of a locking screw 11. A coil spring 12 connects the screw 11 to a stop screw mounted rigidly in the supporting shoe 3 in order that the peg 10 may be permanently urged into a position in which it bears against the cam 9. With this arrangement, it will be readily appreciated that by means of the cam 9, rotation of the motor M will cause the pivotally mounted block 5, and consequently the heated pin P, to execute a reciprocating pivotal movement backwards and forwards in relation to the travel of the cloth.

The pin P is formed at its upper portion with a shoulder $P^1$ above which is a stem $P^2$ (FIG. 6) which passes through a sleeve 13 made of electrically insulating material and located in the axial opening of a shouldered ring 14 screwed into the pivoting block 5. At its upper end, the stem $P^2$ can have screwed on to it a nut 15 which is appropriately insulated electrically from the ring 14 and which bears on the head of a bolt 16 forming an input terminal for an electrical connection C. This bolt 16 is also insulated from its retaining plate 17 which is fixed by screws 18 to the upper face of the pivotally mounted block 5.

An electrical resistance R is clamped at one end between the shoulder $P^1$ and the shouldered ring 14 by means of an insulating washer, and is then wound on to the periphery of an insulating sleeve 19 arranged around the pin P. At its opposite end the resistance R is connected to a rod 20 fast with the ring 14 and constituting a ground for the electrical circuit.

Furthermore it should be noted that the screws 6, which form the pivots for the block 5, also permit the engagement and vertical adjustment of a stirrup- or generally U-shaped shoe guide 21 which is arranged to lie above and in contact with the fabric and is intended to position precisely the conical end of the heated pin P for carrying out the dividing operation.

The apparatus, thus constructed, is connected electrically to an electrical transformer T (see FIG. 10) connected to the supply circuit of the weaving loom. The electrical connection C for heating the pin P has at its end a mobile plug F which is adapted to be inserted in one of the multiple output taps $T^1$ for different voltages of the transformer. This arrangement makes it possible to control the temperature of the pin P precisely in accordance with the nature and thickness of the fabric.

The electrical supply connection G for the motor M is connected to the output terminal $T^2$ of the transformer T in accordance with the corresponding voltage, and a wire $G^1$ provides a common ground connection for the motor M and the pin P.

In the embodiment illustrated in FIGS. 7, 8 and 9, the supporting shoe guide 21, which is arranged in a manner similar to the arrangement in the previously described embodiment, also permits a block 23 (corresponding to the block 5 and supporting the heating point P) to execute pivotal movement.

A rod 24 fast with the supporting shoe 22 is used for vertically adjusting the position of an electromagnet E by means of a strap 25, while a plate 26, fixed by screws or otherwise to the upper portion of the block 23, is provided in the magnetic field of the core $E^1$ of the electromagnet E. The plate 26, by means of a bolt 27 or otherwise, has mounted thereon a contact arm 28 which is electrically insulated from the plate and directly connected, by means of a wire H, to the output terminal of the energizing solenoid S of the electromagnet E (see FIG. 11). By means of a coil spring 29 (FIG. 9) connecting the block 23 to a fixed point on the frame of the electro-magnet E, the contact arm 28 bears permanently on a mobile finger 30 which is mounted on the supporting shoe 22 and which constitutes a ground in the circuit. The finger 30 is centered on a fixing stud 31 and on a guide dog 32, there being a coil spring 33 constantly urging the finger 30 against the supporting shoe 22. The compression exerted by the spring 33 is adjustable by means of stud 31 so that the amplitude of oscillation of the block 23 may be regulated.

With these arrangements, it will be appreciated that by means of the electrical connection $G^2$ connected to the output terminal $T^2$ of the transformer T, electrical current can flow freely owing to the contact of the arm 28 and the finger 30. This causes the electromagnet E to be energized, and, as a consequence, the plate 26 is urged into contact with the core $E^1$. Thus, on the one hand the block 23 and consequently the pin P, are displaced pivotally, and on the other hand contact between the arm 28 and the finger 30 is broken. The spring 29 then returns the block 23 to its position shown in unbroken lines in FIG. 7 and contact between the arm 28 and the finger 30 is re-established. In this way a reciprocating pivotal movement of the block 23 is achieved.

It should also be noted that the pin P is heated in both of the illustrated embodiments by means of an independent electric circuit (C and $C^1$ respectively) having a mobile plug to correspond to each of the multiple taps $T^1$ for different voltages of the transformer T.

The apparatus thus constructed may be covered by an apertured casing (as is shown at 34 in FIG. 9) of U-shaped form which is fixed to the lateral sides of the corresponding supporting shoe 3 or 22.

In addition, the tip of the pin P which is in contact with the fabric may be continually cleaned by means of a small non-fusible brush mounted at a fixed position and arranged to contact the tip of the pin during rearward movement of the same.

Also, it will be apparent that this oscillatory movement of the pin can be effected by any appropriate system, and is not restricted to an electronic system. The arrangements described above make it possible to obtain: (i) a reduction in the heating temperature of the pin owing to its oscillatory movement; (ii) direct contact of the pin on the fabric without any risk of marking or producing irregularities on the fabric; (iii) constant movement of the pin, even when the loom is stopped, without prejudicing the end portion and the cut ends at the cutting line; and (iv) welded selvedges which do not include any irregularities.

What is claimed is:

1. A method of dividing a web of thermofusible synthetic plastic material by means of a heated dividing element, the method comprising the steps of effecting relative displacement between the web of material and the heated element in such a manner that the heated element divides the web along a predetermined line therein, and simultaneously imparting to the heated element a pivotal, a reciprocatory movement so that that portion of the element which is in contact with material reciprocates in a plane perpendicular to the web and including the line of division.

2. A method according to claim 1, wherein the heated element is pivotally reciprocated between one position wherein the element is substantially perpendicular to the line of division, and another position disposed rearwardly, relative to the direction of displacement, of said one position.

3. A method according to claim 2, wherein, in said one position, the heated element is disposed substantially perpendicular to the web of material.

4. Apparatus for dividing a web of thermofusible synthetic plastic material, the apparatus comprising a dividing element which is adapted to be heated, means for mounting said element so that relative displacement between a web of thermo-fusible synthetic plastic material and said element may be effected for dividing the material along a predetermined line, and means for simultaneously imparting to said element a pivotal, reciprocating movement so that that portion of the element which, in operation, contacts the material will reciprocate in a plane perpendicular to said web and including the line of division.

5. Apparatus according to claim 4, wherein said means for imparting pivotal reciprocating movement to said element comprises a holding member supporting said dividing element, means pivotally mounting said holding member and means for imparting to said holding member a pivotal reciprocating movement.

6. Apparatus according to claim 5, wherein said means for imparting pivotal reciprocating movement to the holding member comprises a cam which is adapted to rotate, cam following means rigidly mounted for movement with said holding member, and means for constantly urging said cam following means into contact with said cam.

7. Apparatus according to claim 6, wherein said cam is mounted for rotation on an output shaft of an electric motor.

8. Apparatus according to claim 4, including means for heating said dividing element, said heating means comprising a temperature-variable electrical resistance arranged closely adjacent said element, a transformer having a number of terminals each for supplying a different voltage, and means for selectively connecting said electrical resistance with one of said transformer terminals.

9. Apparatus according to claim 4, wherein said means for imparting pivotal reciprocating movement to said element comprises a holding member in which said dividing element is mounted, means pivotally mounting the holding member, an electromagnet having a core, a metallic element rigidly secured to the holding member for pivotal movement therewith and arranged for movement between a first position wherein the metallic element is capable of being attracted towards said core when the latter is energized for pivotally displacing the holding member, and a second position wherein the metallic element is closer to said core than in said first position, a first electrical contact which is fixed in relation to said holding member, and a second electrical contact which is mounted for movement with said holding member and which, when said metallic element is in said first position, forms an electrical connection with said first electrical contact, whereas, when said metallic element is in said second position, said first and second electric contacts are separate from one another.

10. Apparatus according to claim 4, including a shoe guide for guiding the material to be cut, an means adjustably mounting said guide in a position which is fixed in relation to said dividing element.

References Cited

UNITED STATES PATENTS

| | | | |
|---|---|---|---|
| 1,140,170 | 5/1915 | Laserson | 30—140 |
| 2,983,078 | 5/1961 | Mistler et al. | 83—16 |

ANDREW R. JUHASZ, Primary Examiner

JAMES F. COAN, Assistant Examiner

U.S. Cl. X.R.

30—140; 83—171